(12) United States Patent
Bisti et al.

(10) Patent No.: US 11,640,249 B2
(45) Date of Patent: May 2, 2023

(54) ACCESS VERIFICATION ON PORTABLE MASS STORAGE DEVICES

(71) Applicant: International Business Machines Corporation, Armonk, NY (US)

(72) Inventors: Jeffrey Bisti, New Paltz, NY (US); Philip Siconolfi, Wappingers Falls, NY (US); Tyler Nicole King, Wappingers Falls, NY (US); Robert Paquin, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/475,428

(22) Filed: Sep. 15, 2021

(65) Prior Publication Data

US 2023/0080084 A1    Mar. 16, 2023

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 7,748,031 B2 | 6/2010 | Gonzalez et al. | |
| 8,775,800 B2 | 7/2014 | Doerner et al. | |
| 9,471,805 B2 | 10/2016 | Fisher et al. | |
| 9,635,317 B1 | 4/2017 | Ludwig et al. | |
| 2003/0110046 A1 | 6/2003 | Cofta | |
| 2010/0131574 A1 | 5/2010 | Reese et al. | |
| 2017/0371573 A1* | 12/2017 | Kim | G06F 3/0619 |
| 2020/0264959 A1* | 8/2020 | Byun | G11C 16/0483 |
| 2020/0334372 A1* | 10/2020 | Kim | H04L 63/0838 |

FOREIGN PATENT DOCUMENTS

CN      100485724 C      5/2009

OTHER PUBLICATIONS

ATP, "Securstor AES Encryption microSD cards" May 13, 2021, 5 pages.

(Continued)

*Primary Examiner* — Edward J Dudek, Jr.
*Assistant Examiner* — Ralph A Verderamo, III
(74) *Attorney, Agent, or Firm* — Cantor Colburn LLP; Teddi Maranzano (57) ABSTRACT

Aspects include receiving, at a portable storage device, a file from a digital device. The file is stored into an unprotected storage area on the portable storage device and a storage policy associated with the digital device is accessed by the portable storage device. It is determined, by the portable storage device, based at least in part on the portable storage policy, whether to store a copy of the file in a protected storage area on the storage device. Access to the protected storage area is restricted to authenticated users. A copy of the file is stored in the protected storage area in response to determining that a copy of the file should be stored in the protected storage area.

17 Claims, 8 Drawing Sheets

(56) References Cited

OTHER PUBLICATIONS

Declan McCullagh, "Nikon's photo encryption reported broken" CNET.com, May 12, 2021, 3 pages, https://www.cnet.com/news/nikons-photo-encryption-reported-broken.
DPReview, "Lexar Lock Tight tested" Published Jun. 6, 2005, 8 pages, https://www.dpreview.com/articles/2678280273/lexarlocktight.
Freedom of the Press Foundation, https://freedom.press, San Fancisco, CA, Dec. 14, 2016, 5 pages.
Qualcomm Atheros, "Datasheet for Qualcomm Atheros AR6001GL" May 13, 2021, 4 pages, https://www.ath-drivers.eu/qualcomm-atheros-datasheets-for-AR6001GL.html.
EDN, "Micro SD cards with AES flash memory encryption and access protection", Retrieved Apr. 28, 2021, from https://www.edn.com/micro-sd-cards-with-aes-flash-memory-encryption-and-access-protection, Jul. 2014, 2 pages.
Lee et al., "A study on a secure USB mechanism that prevents the exposure of authentication information for smart human care services", Hindawi Journal of Sensors, 2018, 18 pages.
Rouhi, "Ring Announces End-to-End Encryption, Privacy, Security and User Control Updates", Retrieved from https://blog.ring.com/2020/09/24/ring-announces-end-to-end-encryption-privacy-security-and-user-control-updates; Sep. 2020, 7 pages.
Sorrel, "Teardown: What's Insdie The Eye-Fi Card" Retrieved Jul. 26, 2021 from https://www.wired.com/2008/03/teardown-whats/, 4 pages.
Peter Mell et al., "The NIST Definition of Cloud Computing", NIST, Special Publication 800-145, Sep. 2011, 7 pages.

* cited by examiner

ACCESS VERIFICATION ON PORTABLE MASS STORAGE DEVICES

BACKGROUND

The present invention relates generally to computer storage devices, and more specifically, to providing access verification on portable mass storage devices.

The personal digital device and Internet of Things (IoT) ecosystem involve a lot of digital devices such as cameras, dashboard cameras (dashcams), portable recorders, embedded devices, and appliances that rely on removable mass storage devices such as Secure Digital (SD) cards, CompactFlash (CF) cards, and MicroSD cards. Because of the nature of the physical media, the data written to them can become an easy target for theft and tampering. While most removable storage cards can be encrypted, most digital devices that utilize a standard form-factor SD, CF, or MicroSD card for storage require a freshly formatted card, and do not support any sort of encryption or file protection. This lack of data protection can result in data stored on the portable storage device being misused or compromised. For example, a global positioning system (GPS) or dashcam stolen out of a vehicle can have a storage card that contains personal information that the vehicle owner might not want to share, particularly with the person who stole the device. Similarly, a memory card used to record the usage of a piece of machinery can be tampered with to remove evidence of misuse such as exceeding weight limits, unauthorized use, excessive speed, or falsifying maintenance records with no way of knowing that the tampering occurred.

SUMMARY

Embodiments of the present invention are directed to access verification on portable mass storage devices. A non-limiting example computer-implemented method includes receiving, at a portable storage device, a file from a digital device. The file is stored into an unprotected storage area on the portable storage device and a storage policy associated with the digital device is accessed by the portable storage device. It is determined, by the portable storage device, based at least in part on the storage policy, whether to store a copy of the file in a protected storage area on the storage device. Access to the protected storage area is restricted to authenticated users. A copy of the file is stored in the protected storage area in response to determining that a copy of the file should be stored in the protected storage area.

Other embodiments of the present invention implement features of the above-described method in computer systems and computer program products.

Additional technical features and benefits are realized through the techniques of the present invention. Embodiments and aspects of the invention are described in detail herein and are considered a par of the claimed subject matter. For a better understanding, refer to the detailed description in the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2, which includes

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide access verification on portable mass storage devices. File-level protection is facilitated for data on portable mass storage devices used, for example, by digital devices that may not explicitly support or even be aware of the file protection operations. In accordance with one or more embodiments of the present invention, the digital device (e.g., a camera, a dashboard camera (dashcam), etc.) writes files to a non-protected memory area of the portable storage device, and when a triggering event is detected, the data is moved to a second protected memory area of the portable storage device. Retrieval of the data in the protected memory area by a user is provided by establishing a wireless connection to a web server and authenticating the user before allowing access to the data by the user.

One or more embodiments of the present invention facilitate file-level protection in digital devices that do not support and are not aware of the provided file protection operations by moving the file protection operations to the storage devices. This allows the digital devices to perform write operations to storage devices at full speed and for the protection to take place in the background automatically once the file has been written based on a user defined policy.

As used herein, the terms "portable mass storage device" or "portable storage device" or "removable storage device" refers to storage devices that can be removed from a digital device by a user. Examples of portable storage devices include, but are not limited, to Secure Digital (SD) cards, CompactFlash (CF) cards, and MicroSD cards. One or more embodiments of the portable storage device described herein are implemented by or have the same form factor as a SD, CD, or MicroSD card so that they can be used without requiring any hardware or software changes to the digital devices that store data to them.

As used herein, the term "digital device" refers to any device that uses a portable mass storage device. Examples of digital devices include, but are not limited to, personal devices such as cameras and personal computers, point-of-sale (POS) devices, appliances, and Internet of things (IoT) devices such as dashcams and security systems.

As used herein, the term "file" refers to any type of data that can be stored by a computer and may contain, but is not limited to image data, text data, log data, audio data, and video data.

The personal device/IoT ecosystem includes many devices that rely on removable mass storage devices. Personal devices with removable mass storage may hold confidential, personal, and/or sensitive data that user may not want to share with other people, such as a thief if the digital device and/or the removable storage device is stolen. In contemporary systems there is often a lack of support for encrypted storage in digital devices. For example, while SD cards can be encrypted, they are typically only useable on devices running a user-centric operating system (OS) (e.g., laptops, tablets, and cellular phones) but not on digital devices such as audio recorders, cameras, POS systems, handheld global positioning systems (GPSs), dashcams, and/or other portable devices. These devices with non-user-centric OSs typically require that a portable storage device to be formatted using a format specified by the device manufacturer prior to use by the device. Different devices may specific different formats for the portable storage device.

Cameras and tracking technology devices can be used to protect companies from losses and liabilities. However, this ability to provide protection can be compromised by the use of contemporary removable mass storage devices whose contents are susceptible to tampering. For example, an unprotected portable storage device located in a dashcam is vulnerable to tampering from a third party. In another example, journalists working in hostile areas or highly competitive environments risk having days or weeks of photographs stolen when the contents of their removable storage devices are not stored in a protected format. Contemporary device manufacturers have been resistant to add encryption support for a variety of reasons such as the impact of encryption on data write speeds, having to pair a particular portable memory card with a particular digital device, and possible user confusion or loss of user data (e.g., because the user gets locked out of their files) caused by a more complicated interface to the data.

One or more embodiments of the present invention address one or more of the above describe shortcomings by providing protected storage on a removable mass storage device that does not require any changes to the digital devices that are writing to the removable mass storage devices. By providing protected storage and automatic migration of files to the protected storage in the background based on policies set up by a user, files on the removable storage device can be protected from being accessed by unintended parties.

One or more embodiments of the present invention provide the ability to encrypt data on digital devices that do not explicitly support protection operations. In addition, the granular user-level controls allow the user to specify: the amount of time between data creation and data protection (e.g., move to protected storage area and/or encryption); whether to keep, copy, or permanently delete the original file after providing protection to the file; and what happens when storage device capacity is reached.

Figure 1:
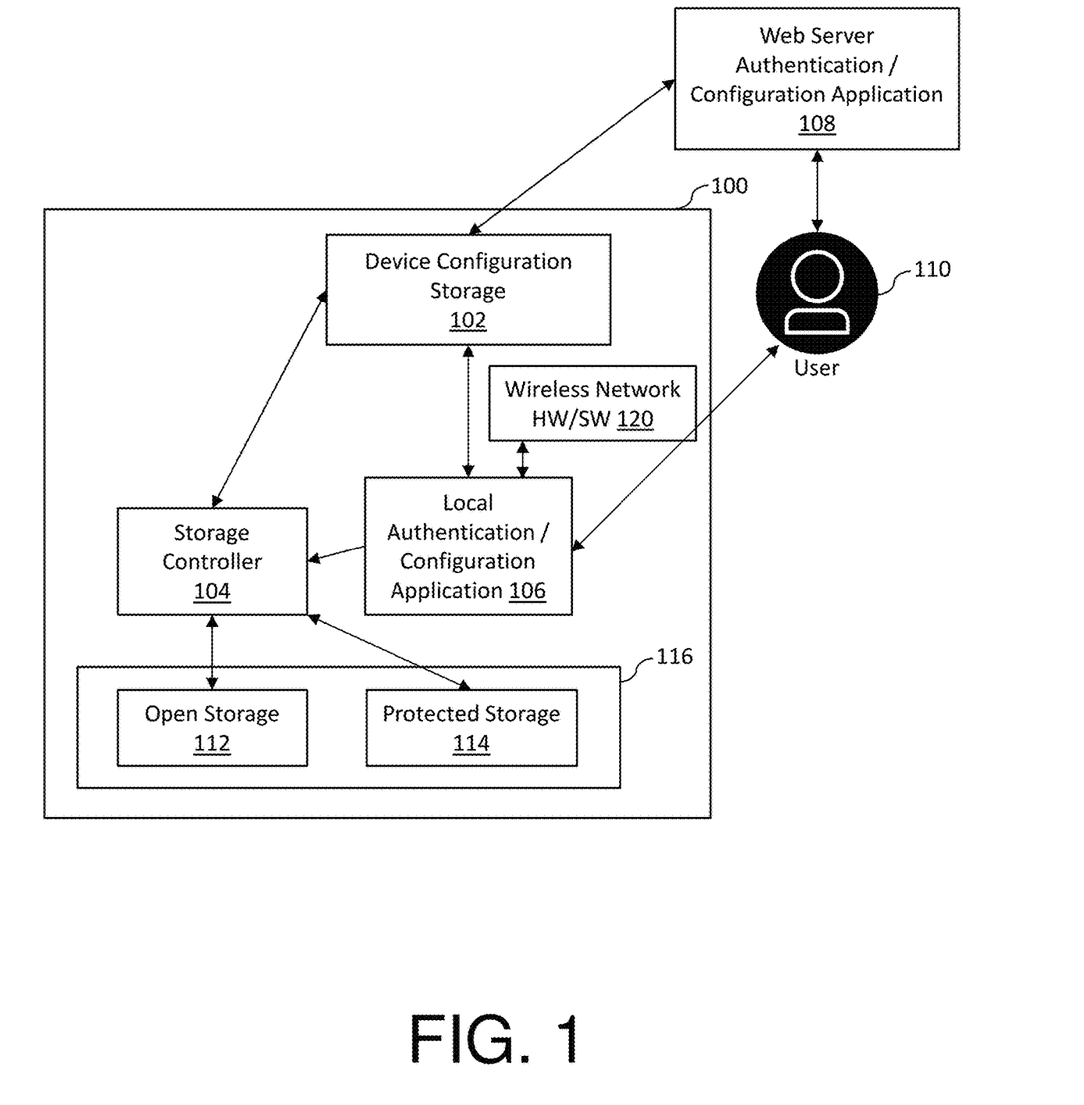
FIG. 1 depicts a block diagram of a portable mass storage device that supports access verification according to one or more embodiments of the present invention.

Turning now to FIG. 1, a block diagram of a portable mass storage device 100 that supports access verification is generally shown in accordance with one or more embodiments of the present invention. The portable storage device 100 shown in FIG. 1 includes device configuration storage 102, storage controller 104, local authentication/configuration application 106, wireless network hardware 120, and storage 116. The portable storage device 100 can be implemented by a storage device that fits the form factor of a standard CF, SD, or other mass storage device which can house the additional electronics required to implement the invention. Also shown in FIG. 1 is a user 110 that is in communication with both the local authentication/configuration application 106 located on the portable storage device 100, and a web server authentication/configuration application 108 remote from the storage device 100 which is accessed via a web-server using the wireless network hardware/software 120.

The storage 116 shown in FIG. 1 includes open storage 112 and protected storage 114 with access to both being controlled by storage controller 104. The open storage 112 is storage that can be accessed without requiring user or device authentication, and includes data in a clear, unencrypted form. In accordance with one or more embodiments of the present invention, the protected storage 114 can be encrypted or simply access restricted based on user preference and/or application requirements. Access to contents of the protected storage requires user authentication including via, an authentication application such as web server authentication/configuration application 108, which may provide an authorization code and/or encryption key to the user 110 to allow access to the protected storage 114.

Figure 3:
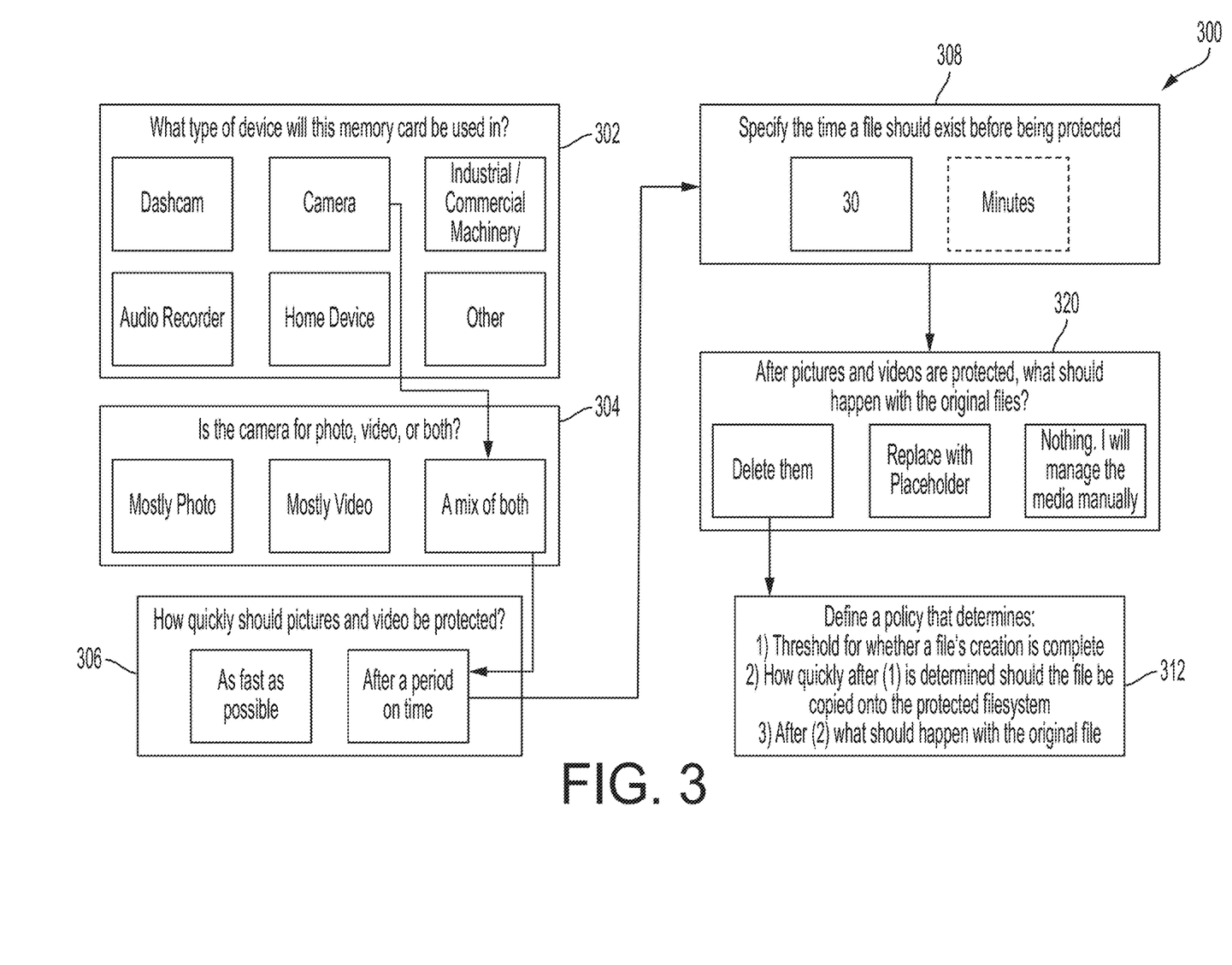
FIG. 3 depicts a flow diagram of a method for setting up a policy for access verification on a portable mass storage device according to one or more embodiments of the present invention.

The storage controller 104 carries out the storage policy which, in accordance with one or more embodiments of the present invention, is stored on the portable storage device 100 in device configuration storage 102. Examples of policies include, but are not limited to, triggering events (if any) that cause the storage controller 104 to copy a file from open storage 112 to protected storage 114, and whether to add a placeholder when a file is deleted from open storage 112. An example process for creating a storage policy is shown in FIG. 3.

In accordance with one or more embodiments of the present invention, upon receiving power or another triggering event, the wireless network hardware/software 120 and local authentication/configuration application 106 become enabled, allowing the user 110 to connect to a web server on a self-generated wireless network (not shown) in a manner similar to other smart devices with limited interfaces requiring configuration. An example of such a device that accesses its own web server on its own network (rather than directly through the host computer) is a smart outlet which can be controlled by Bluetooth and that requires an ad-hoc network connection initially to set up the name and parameters. Upon connecting to the web server authentication/configuration application 108 by way of a web browser, application, or other interface, the user 110 is able to further refine the connection method and also define the policies for protecting assets (e.g., files) stored on the portable storage device 100.

In accordance with one or more embodiments of the present invention, the local authentication/configuration application 106 and the web server authentication/configuration application 106 each include at least a subset of the authentication and/or configuration application code and they work cooperatively to perform the user authentication and storage policy definition described herein.

In accordance with one or more embodiments of the present invention, when the storage device 100 is enabled for use (e.g., connected to a digital device) the local authentication/configuration application 106 on the storage device 100 allows the user to authenticate themself through one or more of a key, a password, an application programming interface (API), etc. The access by the user to the protected storage 114 can remain in effect until a specified condition is met such as, but not limited to, a timeout, a power off, and/or an environmental condition or location. This allows an authorized user to access data that is stored in the protected storage 114 while preventing unauthorized users from accessing the data in the protected storage 114.

In accordance with one or more embodiments of the present invention, the files in the protected storage 114 can be retrieved by enabling the protected storage, which can be triggered based on a policy set by the user. For example, authentication of the user can be satisfied by simply connecting to the portable storage device 100 generated wireless network, connecting to the web server application and authenticating there, or using some other sort of authentication check. If the filesystem itself has been encrypted, then the user must also have the proper key for that access.

Figure 5:
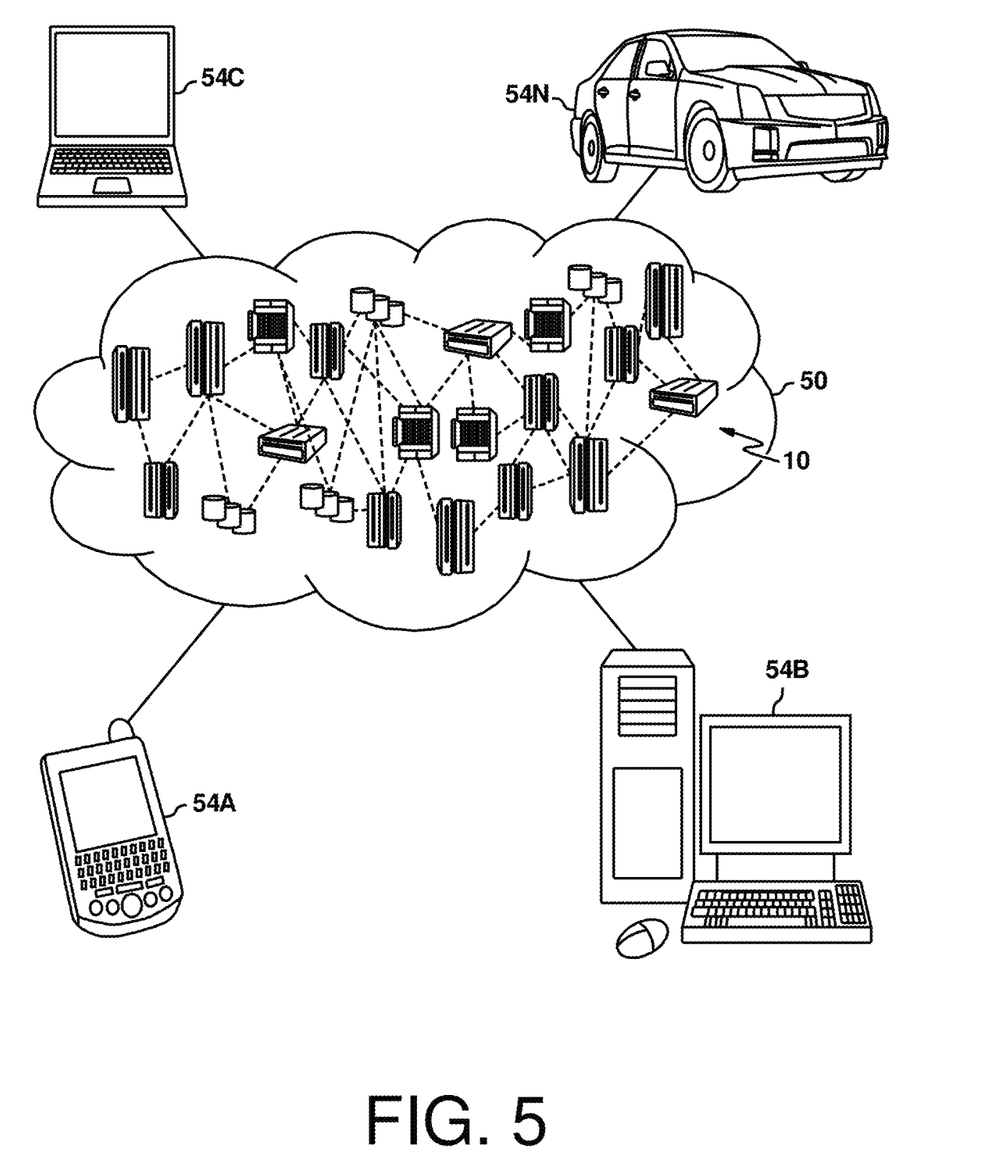
FIG. 5 depicts a cloud computing environment according to one or more embodiments of the present invention.

In accordance with one or more embodiments of the present invention, the user 110 is at a computing device such as one of computing devices 54A-54N of FIG. 5, which communicates with the web server authentication/configuration application 108 (and possibly the local authentication/configuration application 104) via a network such as cloud network 50 of FIG. 5. The web server authentication/configuration application 108 can be executed on one or more of the cloud computing nodes 10 of FIG. 5. In accordance with one or more embodiments of the present invention, the portable storage device 100 includes a processor for performing the processing of the storage controller 104, the local authentication/configuration application 106, and the wireless network hardware/software 120. The processor can be implemented by at least a subset of the computer system 700 shown in FIG. 7.

It is to be understood that the block diagram of FIG. 1 is not intended to indicate that the portable storage device 100 is to include all of the components shown in FIG. 1. Rather, the portable storage device 100 can include any appropriate fewer or additional components not illustrated in FIG. 1 (e.g., additional memory components, embedded controllers, modules, additional network interfaces, etc.). Further, the embodiments described herein with respect to the portable storage device 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
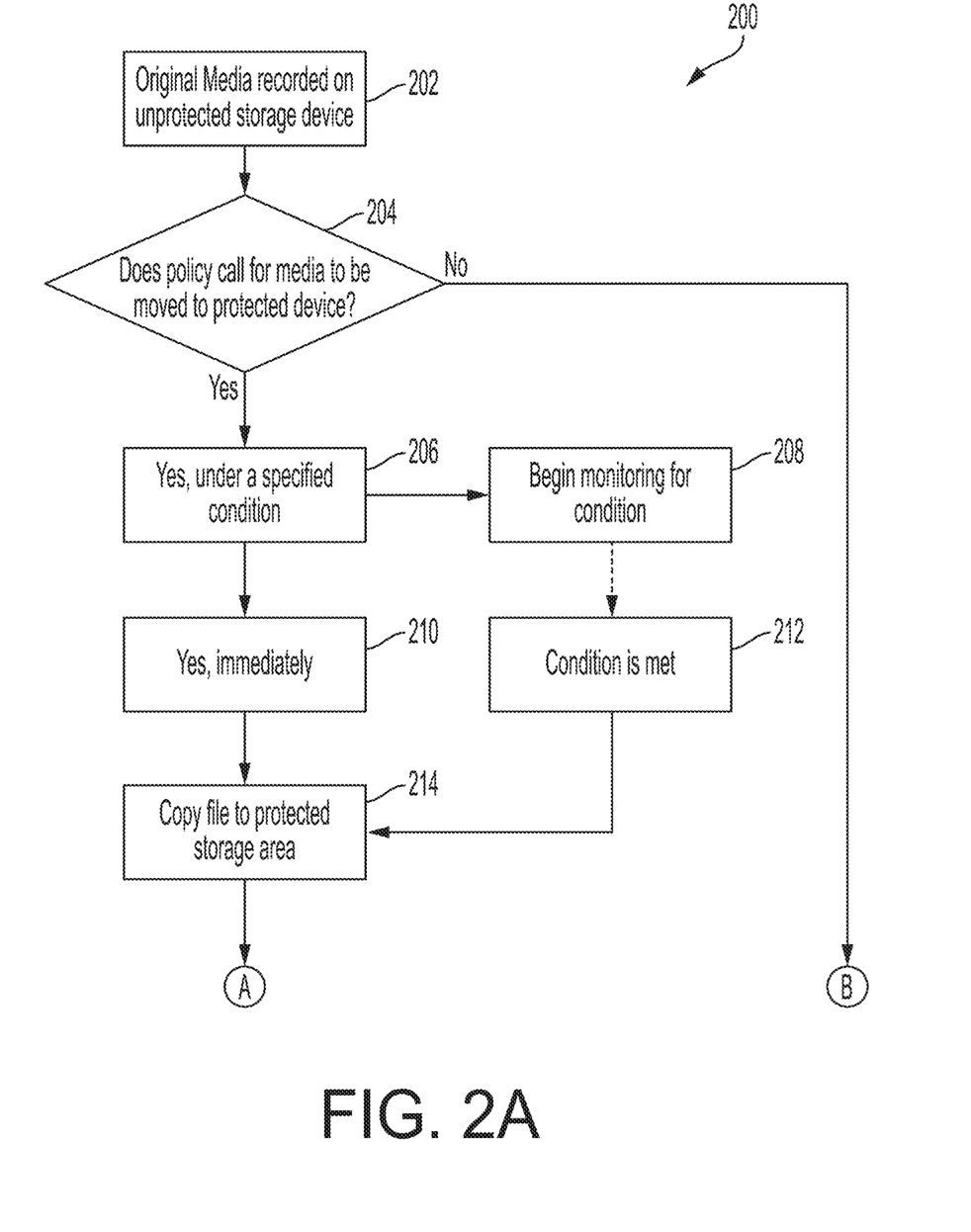
FIG. 2A and FIG. 2B, depicts a flow diagram of a method for performing access verification on a portable mass storage device according to one or more embodiments of the present invention.
Figure 2B:
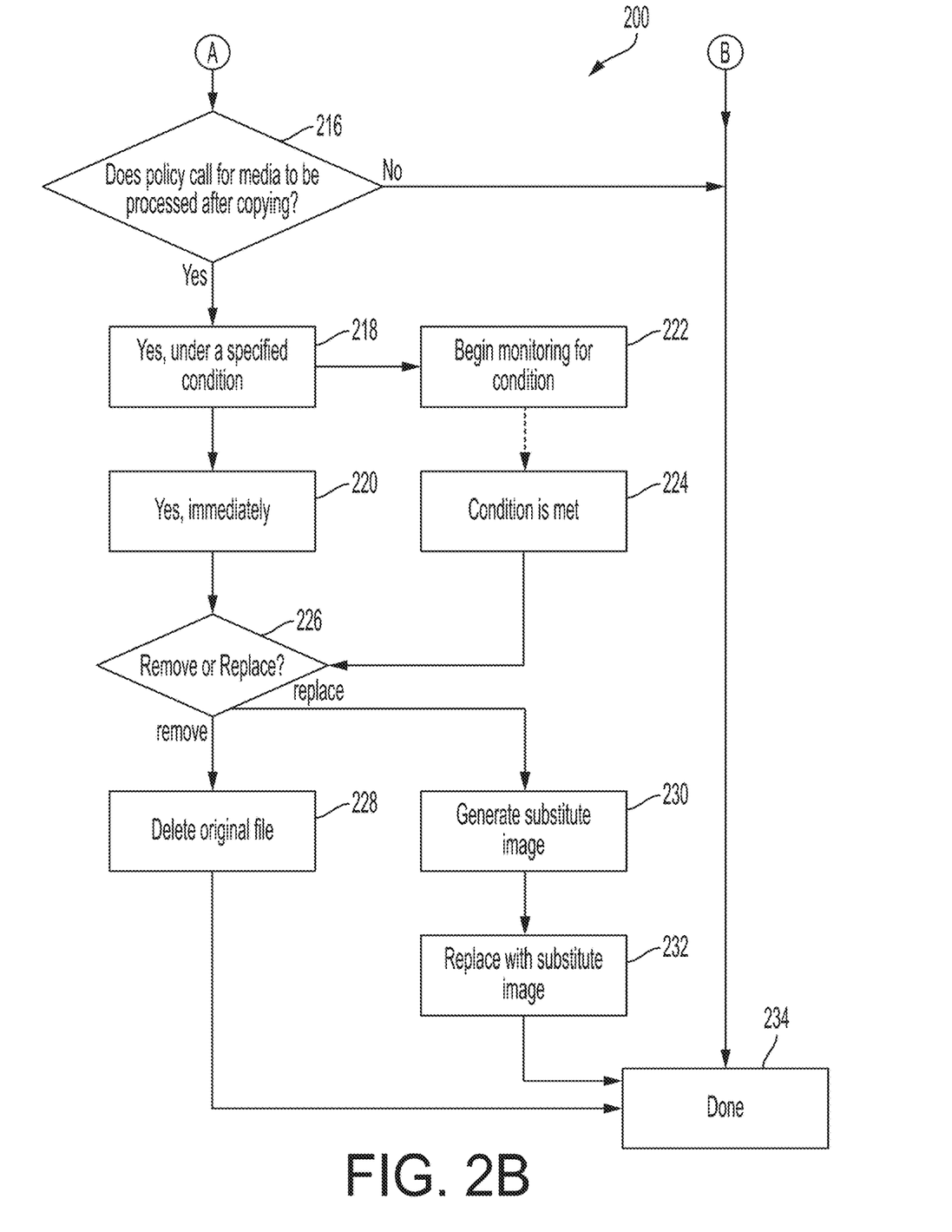

Turning now to FIG. 2, which includes FIG. 2A and FIG. 2B, a flow diagram of a method 200 for performing access verification on a portable mass storage device, such as portable storage device 100 of FIG. 1, is generally shown in accordance with one or more embodiments of the present invention. The processing shown in FIG. 2 can be performed by a storage controller, such as storage controller 104 of FIG. 1, based on one or more policies stored in a device configuration storage location, such as device configuration storage 102 of FIG. 1. In accordance with one or more embodiments of the present invention, the processing shown in FIG. 2 is performed while the portable storage device is inserted into a digital device such as, but not limited to a camera, a dashcam, or a laptop.

Turning now to FIG. 2A, at block 202 an original media file is recorded on unprotected storage, such as open storage 112 of FIG. 1, of the portable storage device, and at block 204 it is determined whether a policy associated with the portable storage device calls for the media file to be copied to protected storage, such as protected storage 114 of FIG. 1. In accordance with one or more embodiments of the present invention, the storage controller can make this determination by checking the storage policy after each write of a file to unprotected storage, or open storage 112. As described further below the policy can be set up to only apply to particular files, such as particular types of files (e.g., images or audio) or to particular environmental factors (e.g., current location of the portable storage device). If it is determined, at block 204, that the policy does not call for copying the file that was written, or recorded, at block 202, then the process ends at block 234 of FIG. 2B.

If it is determined, at block 204, that the storage policy does call for copying the file that was written, or recorded, at block 202, then the process continues at block 206 of FIG. 2A with determining whether the policy specifies that the copying should be performed only when specified conditions occur. If the policy specifies that copying should occur only when a specified condition(s) occurs, then processing continues with monitoring for the specified condition(s) at block 208 and at block 212 it is determined that the condition has occurred, or been met, and processing continues at block 214 with making a copy of the file and storing it in the protected storage area. If it is determined, at block 206, that the policy does not specify that a particular condition(s) has to occur before the file is copied, then processing continues at block 210 with determining that the copying should be performed immediately after the file is written to the unprotected storage. At block 214, the file is copied and stored into the protected storage area. In accordance with one or more embodiments of the present invention, the copy of the file in the protected storage can be in the clear (unencrypted) or it can be encrypted. After block 214 is performed, processing continues at block 216 of FIG. 2B.

Turning now to FIG. 2B, at block 216 it is determined whether the policy calls for the media file, or file, to be processed after a copy is stored in protected storage. If it is determined, at block 216, that the policy does not call for processing the file after a copy is stored in protected storage, then the process ends at block 234. If it is determined, at block 216, that the policy does call for processing the file after a copy is stored in protected storage, then then the process continues at block 218 with determining whether the policy specifies that the processing should be performed only when specified conditions occur. If the policy specifies that the processing should occur only when a specified condition(s) occurs, then processing continues with monitoring for the specified condition(s) at block 222 and at block 224 it is determined that the condition has occurred, or been met, and processing continues at block 216.

If it is determined, at block 216, that the policy does not specify that particular condition(s) has to occur (e.g., a time lapse, a geographic location, a type of file, etc.) before the file is processed, then processing continues at block 222 with determining that the processing should be performed immediately after the file is copied to the protected storage. Processing continues at block 226.

At block 226 of FIG. 2A, it is determined whether the processing to be performed is a removal or a replacement of the file in the unprotected storage location. If the processing is removal, then processing continues at block 228 with deleting the original file from the unprotected storage and the process ends at block 234. If it is determined at block 226 that the processing is replace, then processing continues at block 230 with generating a substitute file. In accordance with one or more embodiment of the present invention, the substitute file is configured so that the digital device that is writing and reading from the portable storage device cannot tell that the original file has been replaced by the substitute file. This allows the substitution to occur without impacting the digital device which may perform processing that depends on the original file being stored at a particular location and/or being a particular size and/or being stored at a particular time. In accordance with one or more embodiments of the present invention, the digital device cannot tell the difference between the original file and the substitute file. For example, the substitute file can be creating by copying the metadata from the original file (e.g., time stamp, sequence number, and file type). In addition, the substitute file can be the same size and type as the original file and contain different content (e.g., a selected pattern). At block 232, the original file in the unprotected storage is replaced with the substitute file and the process ends at block 234.

The processing shown in FIG. 2A and 2B is not intended to indicate that the operations are to be executed in any particular order, or that all of the operations shown in FIG. 2A and FIG. 2B are to be included in every case. Additionally, the processing shown in FIG. 2A and FIG. 2B can include any suitable number of additional operations.

Turning now to FIG. 3, a flow diagram of a method 300 for setting up a policy for access verification on a portable mass storage device is generally shown in accordance with one or more embodiments of the present invention. The processing shown in FIG. 3 can be performed by one or both of local authorization/configuration application 106 and web server authentication/configuration application 108 of FIG. 1 in response to instructions from a user, such as user 110 of FIG. 1.

As described previously, the portable storage device can establish a wireless connection to a network and to the user. Upon connecting, by way of browser, application or other interface, the user can further refine the connection method. In accordance with one or more embodiments of the present invention, the user determines if a file (e.g., a particular type of file, a file having particular name or partial name, etc.) is a candidate to be protected. The user also decides if after protecting the file (e.g., an image), the original file can be deleted, replaced with a placeholder, or left alone until processed manually. This can be done at the individual field level, or by streamlining the process with a guided series of menus such as those shown in FIG. 3.

Block 302 of FIG. 3 asks the user to identify what type of device the portable storage device will be used in. In the example shown in FIG. 3, the user selects camera in block 302 which causes block 304 to be presented to the user to determine if the camera will be used for photos, video, or both photos and video. In the example shown in FIG. 3, the user selected a mix of both, which causes block 306 to be presented. At block 306, the user is asked about how quickly the pictures and videos should be protected, which results in block 308 being presented to the user so that the user can select and amount of time that the file can be stored in unprotected storage on the portable storage device before being protected. The user can then be presented with block 320 which asked the user what should happen to the original files after a copy has been moved to protected storage. In the example shown in FIG. 3, the user selects the delete original file option. Based on this guided set of questions and the user's responses to the questions, a policy is defined and saved, for example in device configuration storage 102 of FIG. 1.

The policy defined in FIG. 3 and as described in block 312 determines (1) a threshold for whether a file's creation is complete, (2) how quickly after (1) is determined should the file be copied onto the protected filesystem, and (3) after (2) what should happen with the original file.

In accordance with one or more embodiments of the present invention, other criteria (and other guided menus with different blocks and content) can also be included in a policy and different rules can be put in place for different file types, files created at different times (e.g., particular days or times of day), files created in different geographic locations, files of particular sizes, files following particular naming conventions, etc. For example, the video files and the image files in the example in FIG. 3 could be treated differently with the video files being deleted and the image files being replaced with a placeholder. The treatment of files based on any variations and granularities of file characteristics can be implemented in a policy in accordance with one or more embodiments of the present invention.

Because there is a finite amount of space on a storage device, it is possible for the protected storage area to fill up before the unprotected storage area. The policy can specify an action to take when this occurs, such as delete older encrypted (or protected) files, don't process newer files, or trigger some sort of event which can be an internal buzzer, a placeholder image with text, or a message on the web interface. These actions can be performed automatically in accordance with a policy, or they may require user intervention or approval.

The ability to customize polices allows one or more embodiments of the present invention to be utilized in a wide variety of applications and environments. For example, the user can define a storage policy specifying that only a subset of the files will be protected and deleted/replaced because a camera, for example, may produce a lot of non-image metadata files which may not be candidates for the process. In contrast, a memory card being used to collect diagnostics in a piece of industrial machinery may need to manage its own log files, and one or more embodiments of the present invention can be used to verify those log files to make it evident when tampering has taken place. This processing may also indicate which files to include/exclude based on file type, size, and other attributes.

Once programmed with the storage policy, usage of the portable storage device proceeds as usual (e.g., as shown in FIG. 2 above). Files are generated on the digital device (e.g., camera, dashcam, equipment) and recorded on the primary filesystem (e.g., open storage 112 of FIG. 1). When the programmed state is reached, the file or files are moved to a secondary storage area (e.g., protected storage 114 of FIG. 1), which can be encrypted as a whole, or files can be encrypted individually, using credentials that have been loaded at configuration time.

The processing shown in FIG. 3 is not intended to indicate that the operations are to be executed in any particular order, or that all of the operations shown in FIG. 3 are to be included in every case. Additionally, the processing shown in FIG. 3 can include any suitable number of additional operations.

Figure 4:
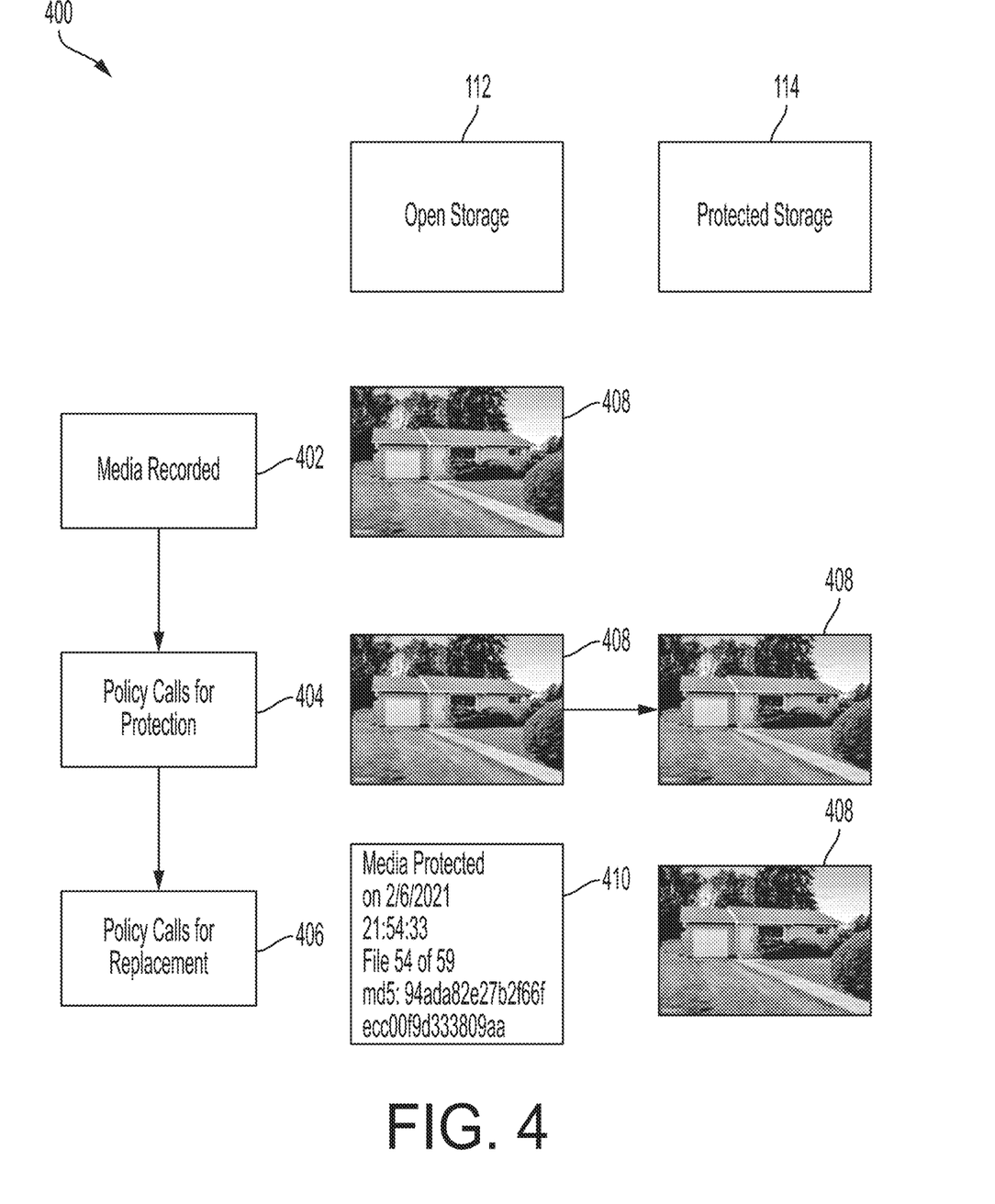
FIG. 4 depicts a block diagram of implementing a policy that includes file protection and replacement according to one or more embodiments of the present invention.

Turning now to FIG. 4, a block diagram 400 of implementing a policy that includes file protection and replacement is generally shown in accordance with one or more embodiments of the present invention. In accordance with one or more embodiments of the present invention the policy was generated using the process 300 shown in FIG. 3 above, and the implementing the policy follows the process 200 shown in FIG. 2 above.

As shown at block 402 of FIG. 4, a file 408, or media, is recorded at block 402 and stored in open storage 112 which is unprotected storage. At block 404, because the storage policy calls for protection, a copy of the file 408 is stored in protected storage 114. At block 406, because the storage policy calls for replacement, a substitute file 410 is stored in the open storage 112 in place of the file 408.

Traditional storage policy methods often do not apply to portable consumer electronics, or electronic devices. For example, power is inconsistent in these electronic devices so considerations need to be made for when operations an occur and how the user can be made aware of their process. In addition, the electronic devices may malfunction when files suddenly get deleted or changed. Unlike self-encrypting devices, portable devices need to be useable in different devices with unpredictable power and environmental conditions. Replacing protected media as described in reference to one or more embodiments herein allows for the user to ensure that their data is protected, and it allows for a validation of retrieved data through a checksum.

One or more embodiments of the present invention provide access verification on a portable mass storage device (form factor of SD, MicroSD, card having wireless or management module). Upon receiving a triggering event (e.g., power on) the storage device self-generates a wireless network that connects to a browser-based configuration/management application. Based on a defined usage policy for files on the device, an action is performed on one or more of the files (e.g., delete, replace, protect, do nothing-manually process the file). Following file generation in the primary filesystem of the storage device and based on the usage policy, the files may be copied to a secondary storage area. The secondary storage area may be protected as a whole, or by individual file using pre-defined credentials.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
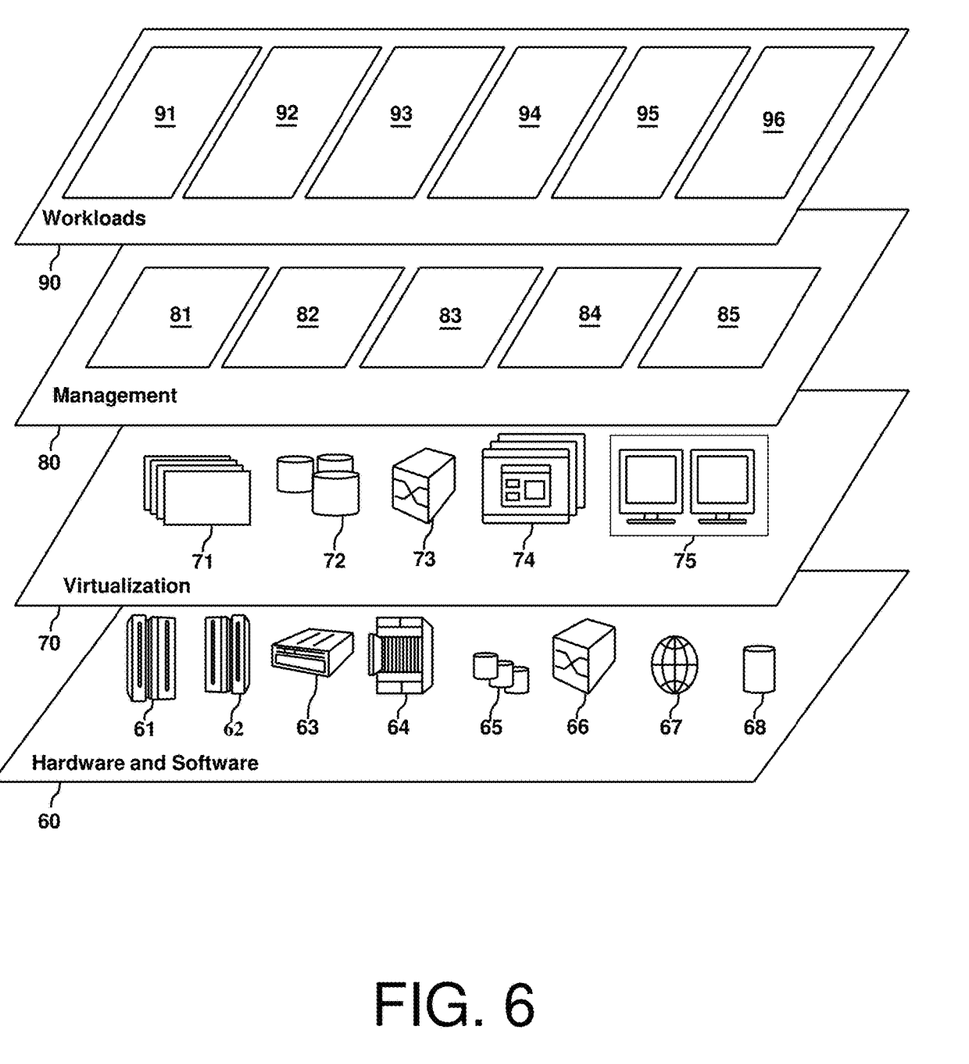
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 7:
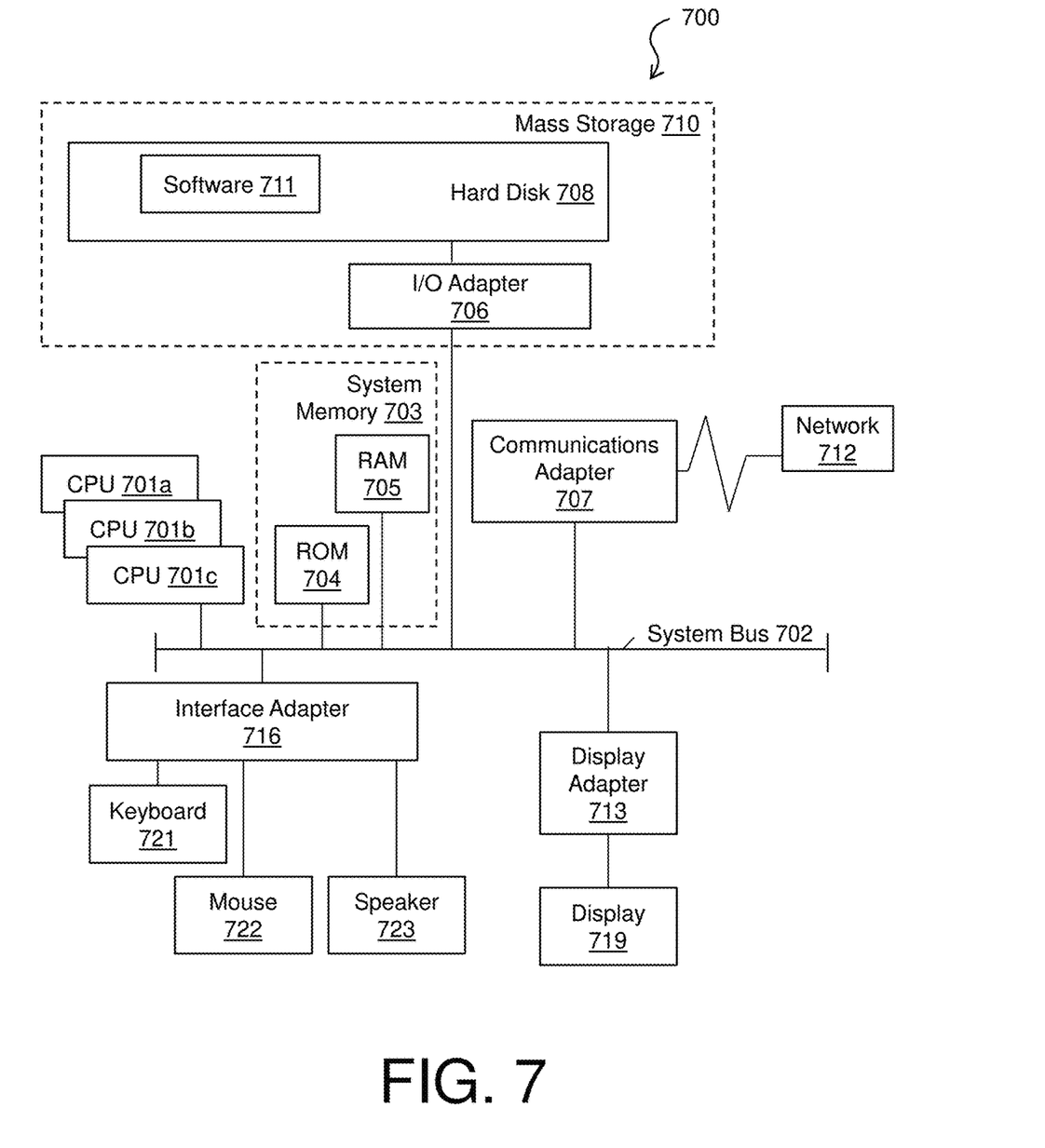
FIG. 7 illustrates a system for performing port mirroring according to one or more embodiments of the present invention.

Turning now to FIG. 7, a computer system 700 is generally shown in accordance with an embodiment. All or a portion of the computer system 700 shown in FIG. 7 can be implemented by one or more cloud computing nodes 10 of FIG. 5 and/or one or more of the computing devices 54A-54N of FIG. 5. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a serial advanced technology attachment (SATA) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS® or AIX® operating system, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a portable storage device, a file from a digital device;
   storing, by the portable storage device, the file in an unprotected storage area on the portable storage device;
   generating, by the portable storage device, a connection to a web server application to guide a user in defining a storage policy associated with the digital device;
   accessing, by the portable storage device, the storage policy associated with the digital device;
   determining, by the portable storage device, based at least in part on the storage policy, whether to store a copy of the file in a protected storage area on the portable storage device, wherein access to the protected storage area is restricted to authenticated users; and
   storing a copy of the file in the protected storage area in response to determining that a copy of the file should be stored in the protected storage area.

2. The computer-implemented method of claim 1, further comprising, in response to storing a copy of the file in the protected storage area:
   determining, based at least in part on the storage policy, whether to delete the file from the unprotected storage area; and
   deleting the file in the unprotected storage area in response to determining that the file should be deleted from the unprotected storage area.

3. The computer-implemented method of claim 1, further comprising, in response to storing a copy of the file in the protected storage area:
   determining, based at least in part on the storage policy, whether the file in the unprotected storage area should be replaced with a substitute file; and
   replacing the file in the unprotected storage area with the substitute file in response to determining that the file in the unprotected area should be replaced with a substitute file,
   wherein the substitute file is configured so that the digital device can use the substitute file in place of the file in the unprotected storage area.

4. The method of claim 1, further comprising:
   receiving a request to access the copy of the file in the protected storage area;
   in response to receiving the request, generating, by the portable mobile storage device, a connection the web server application to authenticate the user;
   providing the user access to the copy of the file in response to the user being authenticated; and
   preventing the user from accessing the copy of the file in response to the user not being authenticated.

5. The method of claim 1, wherein each file in the protected file area is protected individually.

6. The method of claim 1, wherein all of the files in the protected file area are protected as a group.

7. A system comprising:
   a portable storage device comprising one or more processors for executing computer-readable instructions, the computer-readable instructions controlling the one or more processors to perform operations comprising:
   receiving, at a portable storage device, a file from a digital device;
   storing, by the portable storage device, the file in an unprotected storage area on the portable storage device;
   generating, by the portable storage device, a connection to a web server application to guide a user in defining a storage policy associated with the digital device;
   accessing, by the portable storage device, the storage policy associated with the digital device;
   determining, by the portable storage device, based at least in part on the storage policy, whether to store a copy of the file in a protected storage area on the portable storage device, wherein access to the protected storage area is restricted to authenticated users; and
   storing a copy of the file in the protected storage area in response to determining that a copy of the file should be stored in the protected storage area.

8. The system of claim 7, wherein the operations further comprise, in response to storing a copy of the file in the protected storage area:
   determining, based at least in part on the storage policy, whether to delete the file from the unprotected storage area; and deleting the file in the unprotected storage area in response to determining that the copy of the file should be deleted from the unprotected storage area.

9. The system of claim 7, wherein the operations further comprise, in response to storing a copy of the file in the protected storage area:
determining, based at least in part on the storage policy, whether the file in the unprotected storage area should be replaced with a substitute file; and
replacing the file in the unprotected storage area with the substitute file in response to determining that the file in the unprotected area should be replaced with a substitute file,
wherein the substitute file is configured so that the digital device can use the substitute file in place of the file in the unprotected storage area.

10. The system of claim 7, wherein the operations further comprise:
receiving a request to access the copy of the file in the protected storage area;
in response to receiving the request, generating, by the portable storage device, a connection the web server application to authenticate the user;
providing the user access to the copy of the file in response to the user being authenticated; and
preventing the user from accessing the copy of the file in response to the user not being authenticated.

11. The system of claim 7, wherein each file in the protected file area is protected individually.

12. The system of claim 7, wherein all of the files in the protected file area are protected as a group.

13. A computer program product comprising a computer readable storage medium having program instructions embodied therewith, the program instructions executable by one or more processors to cause the one or more processors to perform operations comprising:
receiving, at a portable storage device, a file from a digital device;
storing, by the portable storage device, the file in an unprotected storage area on the portable storage device;
generating, by the portable storage device, a connection to a web server application to guide a user in defining a storage policy associated with the digital device;
accessing, by the portable storage device, the storage policy associated with the digital device;
determining, by the portable storage device, based at least in part on the storage policy, whether to store a copy of the file in a protected storage area on the portable storage device, wherein access to the protected storage area is restricted to authenticated users; and
storing a copy of the file in the protected storage area in response to determining that a copy of the file should be stored in the protected storage area.

14. The computer program product of claim 13, wherein the operations further comprise, in response to storing a copy of the file in the protected storage area:
determining, based at least in part on the storage policy, whether to delete the file from the unprotected storage area; and
deleting the file in the unprotected storage area in response to determining that the file should be deleted from the unprotected storage area.

15. The computer program product of claim 13, wherein the operations further comprise, in response to storing a copy of the file in the protected storage area:
determining, based at least in part on the storage policy, whether the file in the unprotected storage area should be replaced with a substitute file; and
replacing the file in the unprotected storage area with the substitute file in response to determining that the copy of the file in the unprotected area should be replaced with a substitute file,
wherein the substitute file is configured so that the digital device can use the substitute file in place of the file in the unprotected storage area.

16. The computer program product of claim 13, wherein the operations further comprise:
receiving a request to access the copy of the file in the protected storage area;
in response to receiving the request, generating, by the portable storage device, a connection the web server application to authenticate the user;
providing the user access to the copy of the file in response to the user being authenticated; and
preventing the user from accessing the copy of the file in response to the user not being authenticated.

17. The computer program product of claim 13, wherein each file in the protected file area is protected individually.

* * * * *